United States Patent Office 3,299,184
Patented Jan. 17, 1967

3,299,184
METHOD FOR PROCESSING FUSIBLE CROSS-LINKED ETHYLENE/DICARBOXYLIC ANHYDRIDE COPOLYMERS
Clyde J. Whitworth, Jr., and Nathan L. Zutty, Charleston, W. Va., assignors to Union Carbide Corporation, a corporation of New York
No Drawing. Filed Sept. 10, 1962, Ser. No. 222,699
6 Claims. (Cl. 260—897)

This invention relates to a method for processing crosslinked polymeric compositions. More particularly, this invention relates to a method for processing polymers containing pendant dicarboxylic anhydride groups which have been crosslinked with polyols, polyamines or hydroxylamines.

It is well known that high temperature properties of thermoplastic polymers, such as polyethylene, can be improved by crosslinking. Various methods for effecting the crosslinking have been employed, such as the use of peroxides, sulfur or sulfur compounds, and irradiation, whereby bonds are formed between two or more polymer chains and a three-dimensional polymeric structure is produced. Recently, the trend has been toward the incorporation of polymerizable monomers containing reactive groups, such as a carboxyl group, into the polymer and thereafter reacting the resulting copolymer with a poly-functional "crosslinking agent", such as polyhydroxy compound. In general, the resulting crosslinked composition is infusible, thus preventing further working of the material in a melted or partially melted state. For example, to produce polyethylene pipe which is crosslinked by peroxides, it is necessary to blend the peroxide into the polyethylene prior to or during the extrusion of the pipe, whereby crosslinking is effected during the extrusion process. Once the crosslinked article is formed, however, any production errors cannot be rectified by remelting and re-forming the material.

It has now been found that it is possible to form a "reversibly crosslinked" polymer; that is, a polymer which is crosslinked, but which on heating to a temperature in excess of about 225° C. becomes soft enough to permit reworking due to breaking of the crosslinks and, when cooled, again becomes crosslinked.

The polymeric materials which are reversibly crosslinked in general are produced by reacting a copolymer containing a pendant dicarboxylic anhydride group with a crosslinking agent of the group consisting of a polyol, a polyamine or a hydroxylamine. Although it is known that anhydride-containing polymers can be crosslinked with alcohols or amines, the resulting polymeric materials were generally insoluble and infusible. It has now found that by controlling the amount of polyol or polyamine, whereby only one of the available carboxyl groups of each pendant anhydride group is converted to an ester or amide group, the resulting crosslinked polymer softens on heating due to scission of the crosslinks. The copolymer can be worked in this softened state and then cooled, whereby the half-ester or half-amide crosslinks are re-formed. The reactions are illustrated by the following schematic equations:

A. Crosslinking (by curing or cooling)

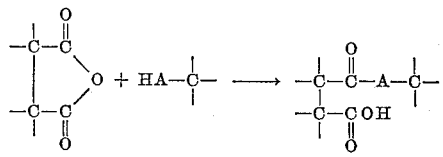

B. Softening and anhydride re-formation (on heating)

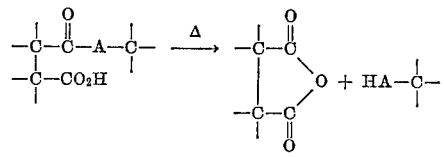

wherein A is either —O— or —NR²—; R² is a hydrogen atom or an alkyl group; and the anhydride group is attached to a polymer chain.

The polymers which are useful in producing reversibly crosslinked polymers are copolymers of ethylene and bicyclo [2.2.1] hept-2-ene-5, 6-dicarboxylic anhydride containing from about 1 to about 40 mole percent, preferably from 1 to about 20 mole percent, polymerized bicyclo [2.2.1]-hept-2-ene-5,6-dicarboxylic anhydride in the copolymer chains in the form of polycyclic units of the formula:

(I)

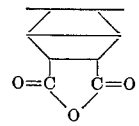

These polymers can be produced according to methods known to those skilled in the art. One such method is by the use of free radical catalysts, employing batch, semicontinuous or continuous processes.

By the term "free radical catalyst" is meant a compound which forms a free radical under the polymerization conditions employed. This type of catalyst is well known and includes hydrogen peroxide; alkyl peroxides, such as tert.-butyl hydroperoxide, di-tert.-butyl peroxide, cumyl hydroperoxide, dicumyl peroxide, and the like; acyl and aroyl peroxides, such as peracetic acid, diacetyl peroxide, perbenzoic acid, dibenzoyl peroxide, and the like; azo compounds such as azo-bis-isobutyronitrile, dimethyl azodiisobutyrate, azo-bis-1-phenylethane, and the like; etc.

The polymerization can be conducted in known manner at atmospheric or superatmospheric pressures up to 50,000 p.s.i.g. or higher, and at temperature of 40° C. or lower to about 200° C. or higher, depending upon the particular catalyst and monomers employed. Diluents, which may or may not be solvents for the monomers or monomers or the resulting polymer, can be employed if desired. The polymer is recovered from the reaction by methods known to those skilled in the art.

Although other crosslinked polymeric systems containing other polymerizable dicarboxylic anhydrides such as maleic anhydride or tetrahydrophthalic anhydride could also be employed in the process of this invention, they are not particularly desirable. For example, maleic anhydride, when copolymerized with ethylene, generally enters the copolymer in equi-molar amounts with the ethylene. The resulting crosslinked polymer has such a high crosslink density that it is extremely brittle and is of little practical value.

The reversibly crosslinked polymeric compositions are produced by reacting the anhydride-containing polymer with a polyol, a polyamine or a hydroxylamine. In general, the polyamine, polyol or hydroxylamine should be employed in a molar ratio of hydroxyl or amino group to dicarboxylic anhydride group of up to about 1:1. If ratios of greater than 1:1 are employed the carboxyl group of the half-ester or half-amide that is formed on crosslinking may also react with the polyol, polyamine or hydroxylamine, resulting in the formation of water and the creation of an irreversible crosslink. When ratios of less than 1:1 are employed, the crosslink density is reduced and a more flexible product results. In general, molar ratios of hydroxyl or amino group in the crosslinking agent to dicarboxylic anhydride group in the copolymer of from about 0.5:1 to about 1:1 are employed.

Polyols, polyamines and hydroxylamines which are suitable for use in producing the reversibly crosslinked polymers employed in the process of this invention are represented by the formula:

(II) 

wherein each X is an —OH group or an —NHR² group; $x$ is 0 or a whole number; $y$ is an integer having a value of at least 1; $z$ is 0 or a whole number; $R^1$ is a polyvalent hydrocarbon radical, such as aliphatic, cycloaliphatic, aromatic, and the like, having a valence of $y+1$ or $z+2$ and containing at least 2, preferably from 2 to about 20, carbon atoms; $R^2$ is hydrogen or an alkyl radical of from 1 to about 10 carbon atoms; Y is a divalent moiety such as —O—,

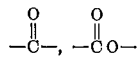

—S—, —S—S—, —SO₂—, —NR³—, and the like; and $R^3$ is a hydrogen atom, or a radical of the formula:

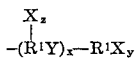

wherein $R^1$, X, Y, $x$, $y$ and $z$ are as defined above. As examples of suitable compounds of this type one can mention: polyols such as ethylene glycol, propylene glycol, trimethylene glycol, tetramethylene glycol, pentamethylene glycol, decamethylene glycol, 2,2-diethyl-1,3-propane diol, 1,3,6-hexane triol, 1,4-cyclohexane diol, coniferyl alcohol, pyrocatechol, resorcinol, hydroquinone, 4,4'-dihydroxybiphenyl, 2,2-bis(4-hydroxyphenyl)-propane, 4-hydroxybenzyl alcohol, glycerol, triethanolamine, 1,1,2-trihydroxybutane, 1,2,3-trimethylol propane, pyrogallol, tris(4-hydroxyphenyl)methane, erythritol, pentaerythritol, arabitol, xylitol, adonitol, mannitol, dulcitol, sorbitol, lignin, poly(vinyl alcohol), poly(allyl alcohol), cellulose, starch, ethylene/bicyclo[2.2.1]hept-2-ene-5-methylol copolymers, diethylene glycol, triethylene glycol, tetraethylene glycol, octaethylene glycol, dipropylene glycol, tripropylene glycol; polyamines such as ethylene diamine, propylene diamine, trimethylene diamine, hexamethylene diamine, diethylene triamine, triethylene tetramine, tetraethylene pentamine, phenylene diamine, N,N'-dimethyl diaminoethane, cyclohexylene diamine, 4-aminobenzylamine, 1,3,6-triaminohexane, and the like; and hydroxylamines, such as ethanolamine, 4-hydroxycyclohexylamine, 4'-aminobiphenylol, and the like; etc.

From the foregoing it can be seen that the reversibly crosslinked resins can be produced by reacting the anhydride-containing polymer with a hydroxyl- or an amino-containing high polymer or with lower molecular weight, monomeric polyols, polyamines or hydroxylamines which react to form a bridge between two anhydride-containing chains.

The type of polyol, polyamine or hydroxylamine to be employed will vary according to the properties desired in the crosslinked polymer. In general, crosslinking compounds having a short chains are not preferred because the resulting polymer is more brittle than when long chain compounds, which permit greater flexibility, are employed. In addition, compounds having closely adjacent hydroxyl or amino groups are less desirable than those having widely spaced groups, particularly with tri- or higher functional compounds, because of the danger of reacting both available carboxyl groups of the anhydride group whereby the reversibility of the crosslinking will be hindered. Moreover, primary alcoholic groups and primary amino groups attached to primary carbon atoms are preferred over secondary or tertiary alcoholic groups and secondary amino groups, or primary amino groups attached to secondary to tertiary carbon atoms, because of the steric hindrance resulting in the latter instances.

Particularly preferred as crosslinking agents are compounds of the formula:

(III) 

wherein A is an —O— group or an —NH— group; $r$ is an integer having a value of from about 2 to about 10; and $s$ is an integer having a value of from 1 to about 10. Subgeneric to the compounds of Formula III are the diols of the formula:

(IV) 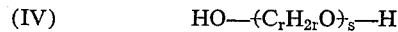

and the amines of the formula:

(V) 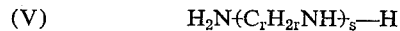

The crosslinked compositions are produced by blending the anhydride-containing polymer with the organic polyol, polyamine or hydroxylamine according to methods known to those skilled in the art, such as by milling, kneading, solvation procedures, and the like. In general, temperatures of less than about 100° C. are employed at this stage to prevent substantial crosslinking prior to forming the blend into the desired shape. The blend is then shaped and cured by heating at a temperature of from 100° C. to 225° C. for a time sufficient for the crosslinks to form via one of the anhydride carboxyl groups; temperatures of from about 150° C. to about 200° C. are preferred at this stage.

The time necessary for curing the resin in general is not critical and periods of from 15 minutes or less to 2 hours or more can be employed. However, when primary amines are employed as the crosslinking agent, the imido group (—NH—) of the half-amide crosslink may on prolonged heating react with the adjacent free carboxyl group to form a dicarboximide-type crosslink of the formula:

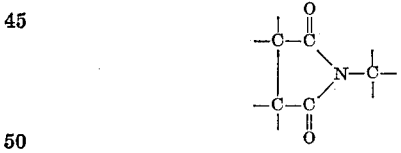

Because water is split out, the crosslink is irreversible. Accordingly, when primary amines are employed, the resin should not be maintained at temperatures in excess of about 200° C. for periods of more than one hour.

The crosslinked compositions are readily fused or softened by heating at a temperature of at least about 225° C. with temperatures of from about 250° C. to about 350° C. preferred, whereby the crosslink is broken. The polymeric composition can then be worked at this temperature to form a new shape and then cooled again, whereby the crosslinks re-form. By the term "working" or variations thereof as used throughout the specification and claims is meant any process for physically forming the uncrosslinked polymeric composition, including such well known methods as molding, extrusion, and the like.

Due to the tendency of the polymers to degrade at such elevated temperatures, it is preferred to incorporate an antioxidant in the resin during the blending of the anhydride-containing polymer and the crosslinking agent. As examples of suitable antioxidants one can mention hydroquinone, pyrocatechol, pyrogallol, sesonal, 3-phenylisocoumarone, the tocopherols, 3,3'-dithiodipropionic acid, thiourea, monoethanolamine, di-ethanolamine, N-phenyl-2-naphthylamine, alkylated diphenylamines, acetone ketone reaction products of diaryl amines, p-benzoxyphenol, 4-methyl-2,6-di-tert.-butylphenol, 2,2'-methylenebis(4-methyl - 6-tert.-butylphenol), 4,4'-thiobis(3-methyl-7-tert.-butylphenol), 2,5-di-tert.-amylhydroquinone, N,N'-di-o-tolylethylenediamine, 4,4'-methylenedianiline, tolylene-2,4-diamine, and the like. It will be noted that certain of these antioxidants have also been listed previously as being useful as crosslinking agents for the production of the reversibly crosslinked resins. When they are employed it is important that the total molar ratio of hydroxyl or amine groups present on both the crosslinking agent and the antioxidant to anhydride groups be low enough that irreversible crosslinking does not occur.

The ethylene/bicyclo[2.2.1]hept-2-ene-5,6-dicarboxylic anhydride copolymers and the ethylene/5-hydroxy-methyl-bicyclo[2.2.1]hept-2-ene copolymers are described and claimed in application Serial No. 328,354, filed December 5, 1963 by P. S. Starcher, E. W. Wise and F. P. Reding as a continuation-in-part of application Serial No. 167,-965, filed January 27, 1962, and now abandoned. The crosslinking of these copolymers is described and claimed in application Serial No. 222,700, filed September 10, 1962, by C. J. Whitworth, Jr. and N. L. Zutty.

The following tests were employed in the examples set forth below to evaluate the polymers employed therein.

(1) Melt index—determined according to ASTM D-1238–52T at 44 p.s.i. and 190° C. and reported in decigrams per minute.
(2) Flow rate—determined according to ASTM D-1238–52T at 205.4 p.s.i. and reported in decigrams per minute.
(3) Tensile strength—determined according to ASTM D-882–56T and reported in pounds per square inch.
(4) Ultimate elongation — determined according to ASTM D-882–56T and reported in percent.
(5) Stiffness modulus—determined according to ASTM D-638–60T and reported in pounds per square inch.

The ethylene/bicyclo[2.2.1]hept-2-ene-5,6-dicarboxylic anhydride copolymers and the ethylene/5-hydroxymethyl-bicyclo[2.2.1]hept-2-ene copolymers employed in the following examples were produced as follows:

A stainless steel, stirred autoclave was charged with the selected substituted bicyclo[2.2.1]hepet-2-ene monomer, benzene and di-tert.-butyl peroxide. The autoclave was flushed with ethylene, sealed and the ethylene pressure was raised to 2000 p.s.i.g. The autoclave was then heated to 160° C., the ethylene pressure was raised to 15,000 p.s.i.g. and the reaction mixture was maintained at these conditions for from 4 to 6 hours. At the end of this period the autoclave was cooled, the ethylene vented and the resulting copolymer was filtered from the reaction mixture, washed with alcohol and dried.

In all cases the substituted bicyclo[2.2.1]hept-2-ene monomer had entered the copolymer in the form of polycyclic units of the formulae:

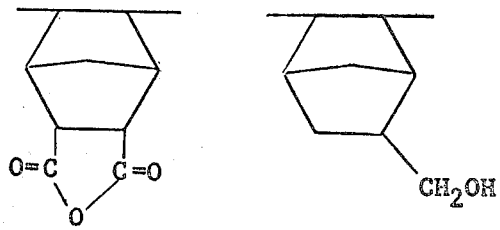

The following examples are illustrative.

*Example I*

A blend of 43.0 weight percent of an ethylene/5-hydroxymethylbicyclo[2.2.1]hept-2-ene copolymer containing 6 weight percent polymerized 5-hydroxymethylbicyclo[2.2.1]hept-2-ene and having a melt index of 52.0 dgm./min. and 57.0 weight percent of an ethylene/bicyclo[2.2.1]hept-2-ene-5,6-dicarboxylic anhydride copolymer containing 6 weight percent polymerized bicyclo[2.2.1]hept-2-ene-5,6-dicarboxylic anhydride and having a melt index of 0.37 dgm./min. was compounded at temperatures of from 75 to 100° C. on a 2-roll mill. Samples of the resulting milled sheet were compression molded at 850 p.s.i. and 120° C. to form plaques measuring 3 inches in diameter and 0.020 inch thick. The plaques were then heated at 175° C. for 30 minutes whereby a crosslinked resin having a flow rate of zero decigrams per minute at 170° C. was produced. The resin was then heated to 275° C. and re-cooled. Additional flow rate determinations, made at temperatures up to 275° C., are set forth in tabular form below:

| Temperature, ° C. | Flow rate, dgm./min. |
|---|---|
| 170 | 0 |
| 190 | 0.010 |
| 220 | 0.011 |
| 250 | 0.740 |
| 275 | 3.60 |
| 190 | 0.050 |
| 170 | 0.038 |

From the table it can be seen that although the cured blend was crosslinked, as evidenced by the flow rate of 0 dgm./min. at 170° C., on heating to 275° C. the crosslinks had broken, as evidenced by a flow rate of 3.6 dgm./min., but reformed to a major extent on cooling to 170° C.

*Example II*

Employing procedures similar to those described in Example I, a blend containing 1.5 weight percent trimethylene diamine and 98.5 weight percent of a 93.2/6.8 ethylene/bicyclo[2.2.1]hept-2-ene-5,6-dicarboxylic anhydride copolymer having a melt index of 2.14 dgm./min. was produced and cured for 30 minutes at 175° C. The cured blend had a flow rate of 0.19 dgm./min. at 190° C. The resin was further heated and additional flow rates were taken at 220° C., 250° C., and, after cooling, again at 190° C. The flow rates are set forth in tabular form below.

| Temperature, ° C. | Flow rate, dgm./min. |
|---|---|
| 190 | 0.19 |
| 220 | 0.76 |
| 250 | 2.58 |
| 190 | 0.60 |

*Example III*

Employing procedures described in Example I, a blend containing 51.5 weight percent of a 95.2/4.8 ethylene/bicyclo[2.2.1]hept-2-ene-5,6-dicarboxylic anhydride copolymer and 48.5 weight percent of a 97/3.0 ethylene/5-hydromethylbicyclo[2.2.1]hept-2-ene copolymer was produced. A portion was cured at 175° C. for 30 minutes to produce a crosslinked resin having a melt index of zero dgm./min., a tensile strength of 2626 p.s.i., an ultimate elongation of 730% and a stiffness modulus of 25,460 p.s.i. An uncured sample of the blend was fabricated into plastic pipe using a 1-inch extruder, the cylinder of which was heated to 260° C. and the die of which was heated to 280° C. After cooling, the properties of the extruded crosslinked blend were: melt index of 0.006 dgm./min., tensile strength of 2342 p.s.i., ultimate elongation of 1100% and stiffness modulus of 30,750 p.s.i. A sample of the pipe which was immersed in refluxing water-saturated toluene for four hours swelled but did not dissolve and was found to have absorbed 43 weight percent, based on the weight of the sample, of toluene. Conventional polyethylene pipe dissolves under these conditions.

The physical properties of the copolymers employed in this example are:

| Copolymer | Melt Index dgm./min. | Tensile Strength, p.s.i. | Ultimate Elongation, percent | Stiffness Modulus, p.s.i. |
|---|---|---|---|---|
| Ethylene/bicyclo[2.2.1]-hept-2-ene-5,6-dicarboxylic anhydride | 2.28 | 2,191 | 669 | 29,001 |
| Ethylene/5-hydroxymethyl-bicyclo[2.2.1]hept-2-ene | 0.27 | 2,566 | 735 | 27,064 |

What is claimed is:

1. The method for processing a crosslinked polymeric composition of an ethylene/bicyclo[2.2.1]hept-2-ene-5,6-dicarboxylic anhydride copolymer and an organic compound having at least two substituents selected from the group consisting of hydroxy, primary amino and secondary amino, wherein the crosslinks of said polymeric composition are selected from the group consisting of half-ester and half-amide crosslinks of said copolymer, which comprises heating said crosslinked polymeric composition at a temperature sufficient to break said crosslinks whereby said composition is rendered substantially free of said crosslinks, working the resulting crosslink-free composition at said temperature and cooling said crosslink-free composition to a temperature sufficient to permit said crosslinks to re-form.

2. Method for processing a crosslinked polymeric composition consisting essentially of an admixture of an ethylene/bicyclo[2.2.1]hept-2-ene-5,6-dicarboxylic anhydride copolymer and an ethylene/5-hydroxymethylbicyclo[2.2.1]hept-2-ene copolymer wherein the crosslinks are substantially of the formula:

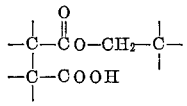

which comprises heating said crosslinked composition at a temperature of at least 225° C. whereby said composition is rendered substantially free of said crosslinks, working the resulting crosslink-free composition at said temperature and cooling said crosslink-free composition to a temperature below 225° C. whereby said crosslinks are re-formed.

3. Method for processing a crosslinked polymeric composition consisting essentially of an admixture of an ethylene/bicyclo[2.2.1]hept-2-ene-5,6-dicarboxylic anhydride copolymer and a compound of the formula:

$$HA\text{\textemdash}[C_rH_{2r}\text{\textemdash}A]_sH$$

wherein A is a member selected from the group consisting of —O— and —NH—; r is an integer having a value of from 2 to 10; and s is an integer having a value of from 1 to 10, wherein the crosslinks are through groups of the formula:

which comprises heating said crosslinked composition at a temperature of at least 225° C. whereby said composition is rendered substantially free of said crosslinks, working the resulting crosslink-free composition at said temperature and cooling said crosslink-free composition to a temperature below 225° C. whereby said crosslinks are re-formed.

4. Method for processing a crosslinked polymeric composition consisting essentially of an admixture of an ethylene/bicyclo[2.2.1]hept-2-ene-5,6-dicarboxylic anhydride copolymer and a polyamine of the formula:

$$H_2N\text{\textemdash}[C_rH_{2r}\text{\textemdash}NH]_sH$$

wherein r is an integer having a value of from 2 to 10 and s is an integer having a value of from 1 to 10, wherein the crosslinks are through groups of the formula:

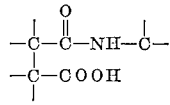

which comprises heating said crosslinked composition at a temperature of at least 225° C. whereby said composition is rendered substantially free of said crosslinks, working the resulting crosslink-free composition at said temperature and cooling said crosslink-free composition to a temperature below 225° C. whereby said crosslinks are re-formed.

5. Method for processing a crosslinked polymeric composition consisiting essentially of an admixture of an ethylene/bicyclo[2.2.1]hept-2-ene-5,6-dicarboxylic anhydride copolymer and trimethylene diamine, wherein the crosslinks are through groups of the formula:

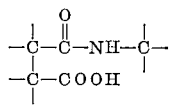

which comprises heating said crosslinked composition at a temperature of at least 225° C. whereby said composition is rendered substantially free of said crosslinks, working the resulting crosslink-free composition at said temperature and cooling said crosslink-free composition to a temperature below 225° C. whereby said crosslinks are re-formed.

6. Method for processing a crosslinked polymeric composition consisting essentially of an admixture of an ethylene/bicyclo[2.2.1]hept-2-ene-5,6-dicarboxylic anhydride copolymer and a polyhydroxy compound of the formula:

$$HO\text{\textemdash}[C_rH_{2r}\text{\textemdash}O]_sH$$

wherein r is an integer having a value of from 2 to 10 and s is an integer having a value of from 1 to 10, wherein the crosslinks are through groups of the formula:

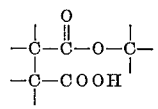

which comprises heating said crosslinked composition at a temperature of at least 225° C. whereby said composition is rendered substantially free of said crosslinks, working the resulting crosslink-free composition at said temperature and cooling said crosslink-free composition to a temperature below 225° C. whereby said crosslinks are re-formed.

No references cited

MURRAY TILLMAN, *Primary Examiner.*

DONALD E. CZAJA, *Examiner.*

J. A. KOLASCH, F. G. FIELD, *Assistant Examiners.*